United States Patent
Hirata et al.

[11] Patent Number: 5,460,338
[45] Date of Patent: Oct. 24, 1995

[54] RETRACTOR HAVING A CLAMPING MECHANISM

[75] Inventors: Kazumi Hirata; Takanobu Sasaki; Masuo Matsuki; Yoshihiro Makishima; Ayaki Oyamada, all of Kanagawa, Japan

[73] Assignee: NSK Ltd., Tokyo, Japan

[21] Appl. No.: 172,249

[22] Filed: Dec. 23, 1993

[30] Foreign Application Priority Data

Dec. 25, 1992 [JP] Japan .................. 4-093220 U
Oct. 5, 1993 [JP] Japan .................. 5-058830 U

[51] Int. Cl.⁶ .................................. B60R 22/42
[52] U.S. Cl. .................................. 242/381.1
[58] Field of Search .................. 242/381.1, 381.4; 297/476, 477, 478; 280/806, 808

[56] References Cited

U.S. PATENT DOCUMENTS

| | | |
|---|---|---|
| 4,241,886 | 12/1980 | Maekawa et al. . |
| 4,437,623 | 3/1984 | Wyder . |
| 4,786,079 | 11/1988 | Wyder et al. .......... 242/381.1 X |
| 4,854,644 | 8/1989 | Ernst ................... 297/476 |
| 4,928,902 | 5/1990 | Tsuji ................... 242/381.1 |
| 5,029,769 | 7/1991 | Föhl . |
| 5,044,575 | 9/1991 | Knabel et al. . |
| 5,127,598 | 7/1992 | Fujimura . |
| 5,232,178 | 8/1993 | Hirata et al. .......... 242/381.1 |
| 5,299,854 | 4/1994 | Fujimura .............. 297/478 X |
| 5,364,048 | 11/1994 | Fujimura et al. ...... 242/381.1 |

FOREIGN PATENT DOCUMENTS

3-112750  5/1991  Japan .

*Primary Examiner*—John M. Jillions
*Attorney, Agent, or Firm*—Sughrue, Mion, Zinn, Macpeak & Seas

[57] ABSTRACT

An object of the invention is to provide at low manufacturing cost a clamp-operated retractor including an emergency locking mechanism adapted to lock the rotation of the winding shaft in the webbing pull-out direction in an emergency such as a collision, in which a webbing clamping mechanism is simple in structure, and is able to quickly stop the webbing from being pulled out. In a clamp-operated retractor according to the present invention, control means for moving a clamp 6 to a first position where pulling a webbing is prevented and a second position where pulling the webbing is permitted is composed of: a tension plate 9 which is so arranged as to be rotatable around the same axis as that of a latch plate 4a, and urges a latch cup 13 in a webbing winding direction, and rotatably supports a pawl 11; and a lever member comprising a clamp lever 7 and an outer plate 8 which are supported on side boards 1a in such a manner that the abutting part 8c of the outer plate 8 is engaged with an engaging portion 9d of the tension plate 9 and the slots 7f of the clamp lever 7 are engaged with the shaft of the clamp 6.

13 Claims, 9 Drawing Sheets

RETRACTOR HAVING A CLAMPING MECHANISM

BACKGROUND OF THE INVENTION

This invention relates to the retractor (take-up device) of a seat belt, and more particularly to an improvement of a retractor which is equipped with a clamping mechanism adapted to directly hold the webbing to minimize the amount of pullout of the webbing in an emergency.

In a conventional seat belt device for safely securing an occupant on the seat in the vehicle, the webbing is held wound a certain length on the winding shaft of the retractor even when the seat belt is used. Hence, even an emergency locking type retractor equipped with an emergency locking mechanism which physically locks the rotation of the winding shaft in the direction of pulling out the webbing (hereinafter referred to as "a webbing pull-out direction", when applicable) for instance with the aid of inertia sensing means which operates in response to abrupt acceleration, collision or deceleration suffers from a difficulty that the webbing is somewhat stretched in an emergency, even though the rotation of the winding shaft in the webbing pull-out direction has been locked. This is because, upon emergency, tension is applied to the webbing wound on the winding shaft to tighten it. If the webbing is stretched in this manner, it impairs the performance of holding an occupant on the seat. Thus, it is necessary to minimize the amount of pull-out of the webbing from the retractor in an emergency.

In order to minimize the amount of pull-out of the webbing from the retractor in an emergency, there have been proposed a variety of retractors equipped with a clamping mechanism which is adapted to directly clamp the webbing at the outlet of the retractor.

For instance, clamping mechanisms disclosed by U.S. Pat. No. 5,127,598 and Japanese Patent Application (OPI) No. 112750/1991 (the term "OPI" as used herein means an "unexamined application") are designed as follows: The clamping mechanism comprises a clamp member which includes a clamp for clamping the webbing on the back of the base of the retractor; and a clamp holder for swingably holding the clamp. And a locking member, which is swung in association with the rotation of a latch member forming an emergency locking mechanism to engage with a ratchet wheel mounted on the winding shaft of the retractor, is supported by a transfer member. When the latch member rotates in the webbing pull-out direction together with the winding shaft, the transfer member is swingably turned by the torque of the winding shaft which is transferred through the locking member, so that the clamp member is swingably turned in a webbing clamping direction. Under this condition, the clamp member clamps the webbing on the back of the base of the retractor, to prevent the webbing from being pulled out of the retractor.

With the above-described clamping mechanism, the clamp tightens the webbing as follows: The latch member turned upon activation of the emergency locking mechanism, the latch member is turned to swing the locking member. After the locking member thus rotated is engaged with the ratchet wheel of the winding shaft, the transfer member swingably turned by the torque of the winding shaft swingably rotates the clamp holder, so that the clamp tightens the webbing.

As is apparent from the above description, in order to transfer the rotation of the latch member to activate the clamp, a number of transfer means are used. In each of the transfer means, energy loss due to its play cannot be neglected. Hence, the period of time is relatively long which lapses from the time instant that the inertia sensing means detects the collision until the clamp clamps the webbing. This delay in the clamp operation lowers the performance of holding an occupant on the seat. In addition, the clamping mechanism is large in the number of components, and intricate in construction, and accordingly high in manufacturing cost.

SUMMARY OF THE INVENTION

Accordingly, an object of this invention is to eliminate the above-described difficulties accompanying a conventional retractor having a clamping mechanism. More specifically, an object of the invention is to provide a retractor which is equipped with an emergency locking mechanism adapted to lock the rotation of the winding shaft in the webbing pull-out direction in an emergency such as a collision, in which a clamping mechanism for the webbing is simple in structure, and is able to quickly stop the webbing from being pulled out.

The foregoing object of the invention has been achieved by the provision of a retractor having a clamping mechanism according to a first aspect of the present invention including:
  an emergency locking mechanism which comprises:
    a ratchet wheel mounted on the winding shaft of a retractor on which a webbing is wound;
    an inertial member rotating in association with the winding shaft;
    a latch member which rotates together with the winding shaft in a webbing pull-out direction to cause a pawl member to engage with the ratchet wheel thereby to lock the rotation of the winding shaft in the webbing pull-out direction; and
    locking means for coupling, when the inertial member delays in rotation with respect to the winding shaft, the latch member to the winding shaft, and
  a clamping mechanism for holding the webbing between a movable clamp member and the rear surface of the base of the retractor to prevent the webbing from being pulled out,
  which further includes: control means for moving the clamp member in a webbing holding direction to position the clamp member at a first position where pulling the webbing is prevented and at a second position where pulling the webbing is permitted,
    the control means comprising:
      a tension plate which is so arranged to be rotatable around the same axis as that of the ratchet wheel, and urges the latch member in a webbing winding direction and rotatably supports the pawl member; and
      interlocking means which is driven in association with the rotation of the tension plate, to move the clamp member to the first or second position.

In addition, the foregoing object of the invention has been achieved by the provision of a retractor with a clamping mechanism, according to a second aspect of the present invention, for directly clamping a webbing to prevent the webbing from being pulled out, which comprises:
  a base;
  a winding shaft rotatably supported on the base for winding the webbing;
  a ratchet wheel mounted on the winding shaft;

a pawl member which engages with the ratchet wheel to lock the rotation of the winding shaft in a webbing pull-out direction;

a movable clamp member;

a lower plate secured to the base, the lower plate cooperating with the clamp member to clamp the webbing; and control means for moving the clamp member in a webbing holding direction to a first position where pulling the webbing is prevented and a second position where pulling the webbing is permitted, the control means comprising:
a tension plate which is so arranged as to be rotatable around the same axis as that of the ratchet wheel, and has first and second swinging end portions; and
interlocking means for moving the clamp member to one of the first position and the second position, the interlocking means being driven in association with the tension plate.

In addition, the foregoing object of the invention has been achieved by the provision of a retractor with a clamping mechanism, according to a third aspect of the present invention, for directly clamping a webbing to prevent the webbing from being pulled out, which comprises:

a base;

a winding shaft rotatably supported on the base, for winding the webbing;

a ratchet wheel mounted on the winding shaft;

a movable clamp member;

a lower plate secured to the base, the lower plate cooperating with the clamp member to clamp the webbing;

an upper plate for guiding the clamp member in a webbing clamping direction;

an upper stay adapted to hold the upper plate; and control means for moving the clamp member in the webbing clamping direction to a first position where pulling the webbing is prevented and a second position where pulling the webbing is permitted.

Further, the foregoing object of the invention has been achieved by the provision of a retractor, according to a fourth aspect of the present invention, including an emergency locking mechanism for locking the rotation of a winding shaft in a webbing pull-out direction in an emergency, and a clamping mechanism for directly clamping a webbing to prevent the webbing from being pulled out, which comprises:

a base;

a winding shaft rotatably supported on the base, for winding the webbing;

a ratchet wheel mounted on the winding shaft;

an inertial member which rotates in association with the winding shaft;

a pawl member which engages with the ratchet wheel and is movable to an engaging position to lock the rotation of the winding shaft in a webbing pull-out direction, and a non-engaging position to allow the rotation of the winding shaft in the webbing pull-out direction;

a latch member which rotates together with the winding shaft in the webbing pull-out direction to cause the pawl member to engage with the ratchet wheel thereby to lock the rotation of the winding shaft in the webbing pull-out direction;

locking means for coupling the latch member to the winding shaft when the inertial member delays in rotation with respect to the winding shaft;

a movable clamp member;

a lower plate secured to the base, the lower plate cooperating with the clamp member to clamp the webbing; and control means for moving the clamp member in a webbing clamping direction to a first position where pulling the webbing is prevented and a second position where pulling the webbing is permitted, the control means comprising:
a tension plate which is so arranged as to be rotatable around the same axis as that of the ratchet wheel; and
interlocking means for moving the clamp member to the first or second position, the interlocking means being driven in association with the tension plate.

In the retractor having clamping mechanism, the interlocking means may be a lever member which is swingably supported with its one end engaged with the tension plate and with the other end engaged with the clamp member, or a cam mechanism comprising a cam surface provided between the tension plate and the clamp member, and an engaging protrusion.

When, retractor, the locking means of the emergency locking mechanism is activated; that is, when the pawl member is engaged with the ratchet wheel by the latch member turned in the webbing pull-out direction, and the tension plate is turned in the webbing pull-out direction, in association with the rotation of the tension plate the interlocking means operates to move the clamp member to the first position, where pulling the webbing is prevented, thereby to positively prevent the webbing from being pulled out. Hence, for the clamp-operated retractor, unlike the transfer member in the conventional clamping mechanism, it is unnecessary to provide, in addition to the pawl member, a locking member engaging with the ratchet wheel mounted on the winding shaft.

In the case where the above-described cam mechanism comprising the cam surface provided between the tension plate and the clamp member, and the engaging protrusion is employed as the interlocking means, the number of components of the transfer means, which are required to transfer the rotation of the latch member to the clamp member to cause the latter to clamp the webbing, can be further reduced, and accordingly the energy loss due to the play of those transfer means can be decreased.

DETAILED DESCRIPTION OF THE PREFERRED EMBODIMENTS

Preferred embodiments of this invention will be described with reference to the accompanying drawings in detail.

Figure 1:
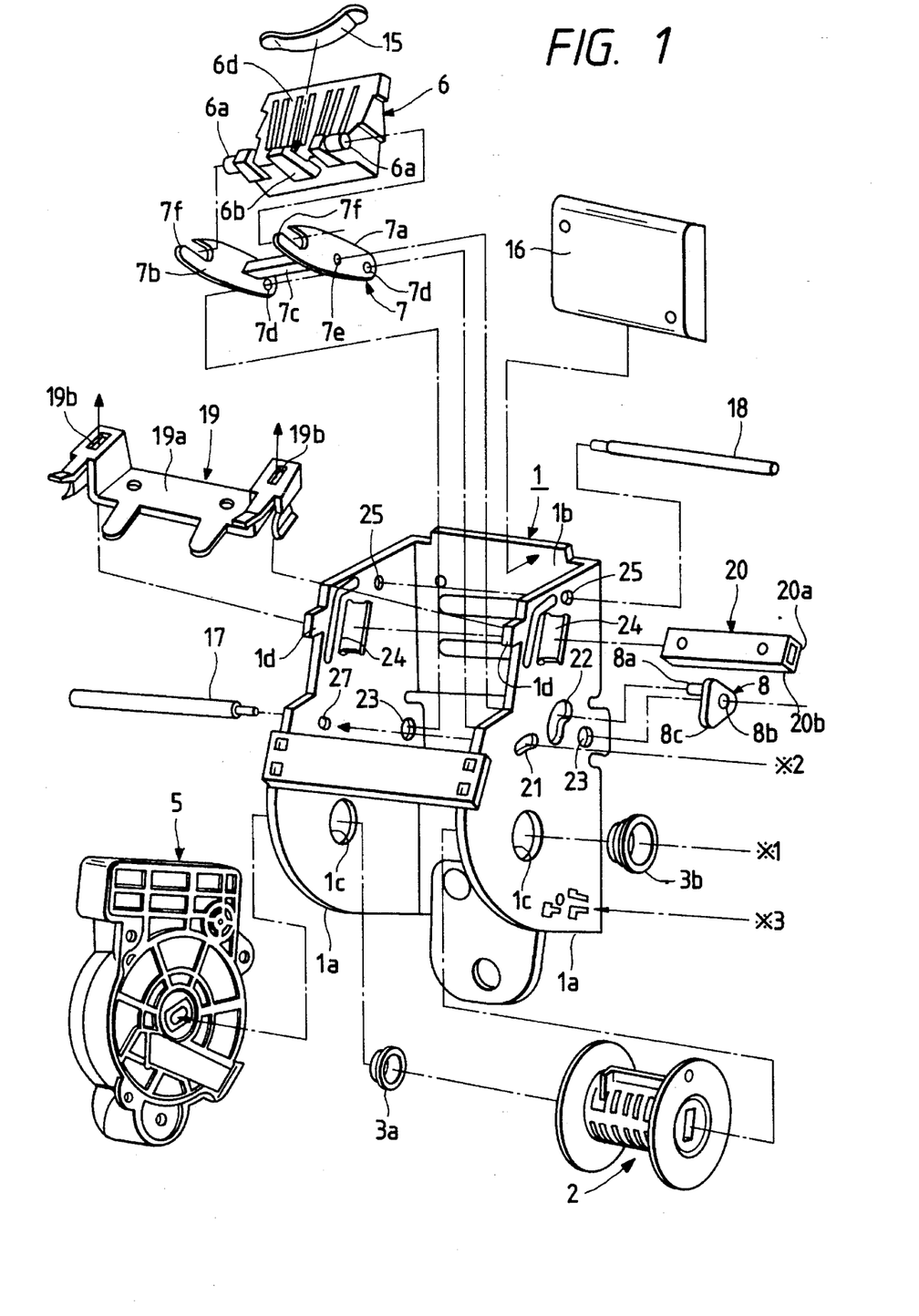
FIG. 1 is a part of an explode perspective view showing a clamp-operated retractor, which constitutes a first embodiment of this invention.
Figure 2:
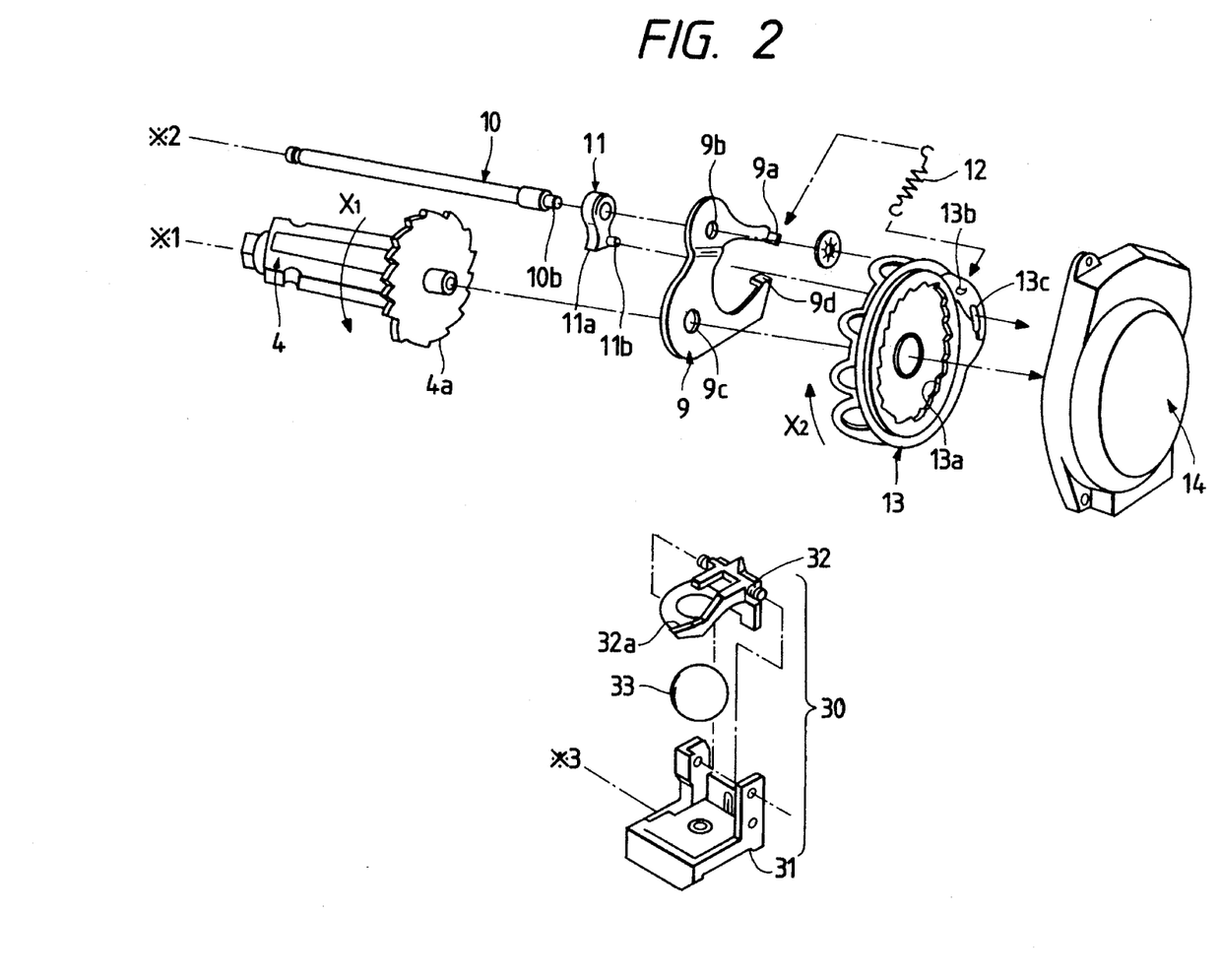
FIG. 2 is the remaining of the exploded perspective view showing the clamp-operated retractor.

FIGS. 1 and 2 are exploded perspective views showing a clamp-operated retractor, which constitutes a first embodiment of the invention. As shown in FIGS. 1 and 2, a base 1 is substantially U-shaped in section, and has two side boards 1a confronted with each other. The side boards 1a have through-holes 1c, respectively. A winding shaft 4, on which a bobbin 2 is fixedly mounted, is swingably inserted through right and left plastic bushings 3b and 3a into the through-holes 1c of the side boards 1a. A webbing is wound on the bobbin 2. A conventional tension reducer 5 is mounted on one end portion of the winding shaft 4, so that the latter 4 is urged to take up the webbing at all times. On the other hand, an emergency locking mechanism is provided at the other end of the winding shaft 4. The emergency locking mechanism is to prevent the webbing from being pulled out. The emergency locking mechanism includes a latch plate 4a which is a ratchet wheel fixedly mounted on the other end portion of the winding shaft 4 in such a manner that the latter 4 is protruded from the outer surface of the ratchet wheel. A tension plate 9 having a through-hole 9c, and a latch cup 13 which is a latch member having internal teeth 13a are loosely mounted on the end portion of the winding shaft 4 thus protruded. A return spring 12 is connected between the spring hanger 13b of the latch cup 13 and the spring hanger 9a of the tension plate 9, so that the latch cup 13 is urged to turn in the direction of the arrow $X_2$. Locking means, and a conventional inertial member (not shown) are provided on the end portion of the winding shaft 4 which is exposed outside the latch cup 13, so that, when tension is applied to the webbing in an emergency thereby to abruptly apply an excessively great torque to the winding shaft 4 in a webbing pull-out direction (or in the direction of the arrow $X_1$), the latch cup 13 is turned in the direction of the arrow $X_1$ against the elastic force of the return spring 12.

In FIG. 2, reference numeral 11 designates a pawl which engages with the latch plate 4a to stop the rotation of the latter 4a in the webbing pull-out direction (in the direction of the arrow $X_1$). The pawl 11 is detachably supported on a pawl pin 10 outside the side board 1a. The pawl pin 10 is inserted into a through-hole 27 formed in one side board 1a and an elongated hole 21 formed in the other side board 1a, and therefore the pawl pin 10 is swingable along the elongated hole 21 with its portion as a fulcrum which is engaged with the through-hole 27. The outer end portion 10b of the pawl pin 10 is inserted into a through-hole 9b formed in a first swinging portion of the tension plate 9. Therefore, the swinging rotation center of the pawl 11 can be shifted along the elongated hole 21. A pawl guide protrusion 11b is extended from the pawl 11, and it is inserted into a pawl guide hole 13c formed in the outer periphery of the latch cup 13.

A sensor casing 31 forming vehicle body acceleration sensing means 30 is fixedly provided below the side boards 1a. Inside the sensor case 31, a ball weight 33 serving as a sensor is provided, and a sensor arm 32 with a locking protrusion 32a is swingably mounted. A sensor cover 14 is provided outside the side board 1a which covers the emergency locking mechanism constructed as described above.

A clamping mechanism is provided inside the base 1, which holds the webbing directly, thereby to prevent the webbing from being pulled out.

The clamping mechanism will be described with reference to FIGS. 1 and 2 and to FIG. 3 which is a fragmentary side view, with parts cut away, showing the clamping mechanism.

The clamping mechanism comprises: a clamp 6 which is a wedge-shaped clamp member having clamp teeth 6c which are to tighten the webbing 26; and an upper stay 19 holding an upper plate 20. The upper plate 20 is a guide member adapted to slidably contact a planar portion 6d opposite to a planar portion where the clamp teeth 6c are formed.

The upper stay 19 has mounting holes 19b which are engaged with protrusions 1d of the side boards 1a, and a mounting plate 19a to which the upper plate 20 is secured with screws. That is, the upper stay 19 is a mounting member for regulating the longitudinal movement of the upper plate 20.

Figure 7:
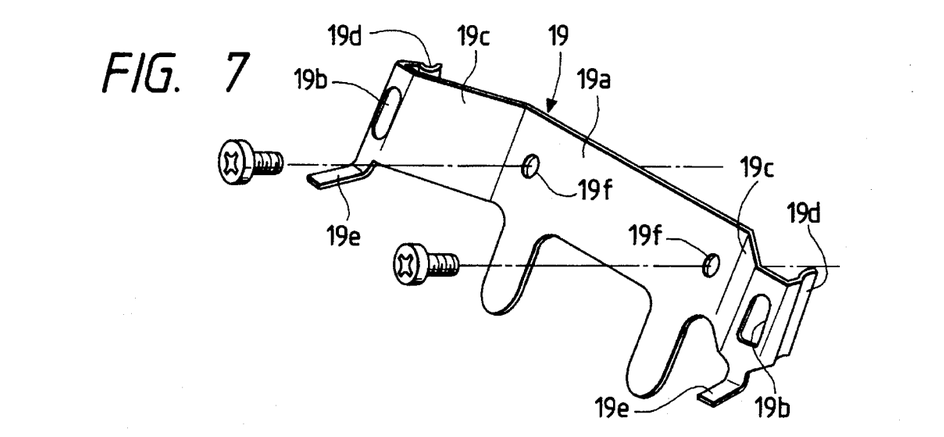
FIG. 7 is an enlarge perspective view of an upper stay shown in FIG. 1.
Figure 8A:
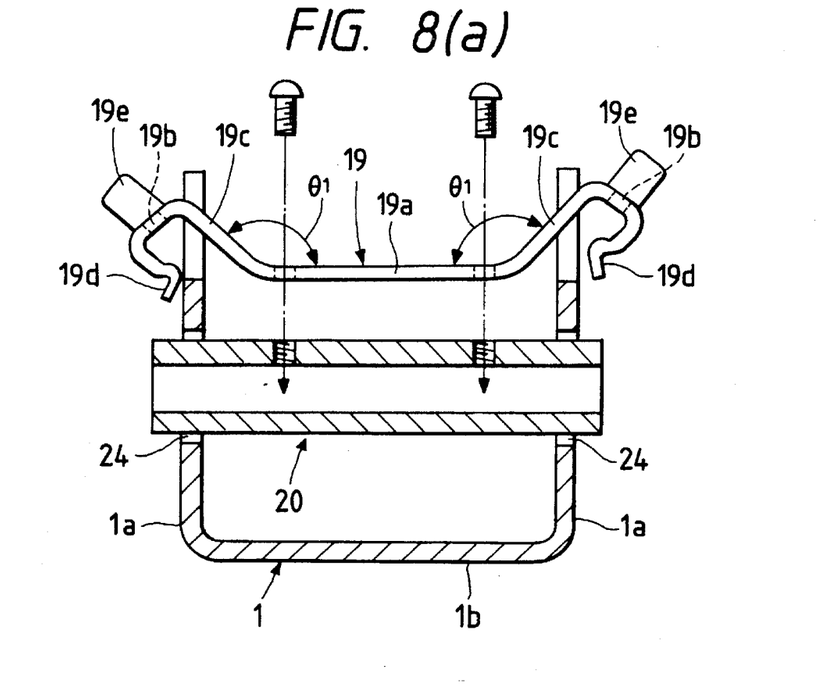
FIG. 8(a) is a fragmentary sectional view of the upper stay shown in FIG. 7 which is to be mounted on the base of the clamp-operated retractor, and the FIG. 8(b) is also a fragmentary sectional view of the upper stay which is mounted on the base.
Figure 8B:
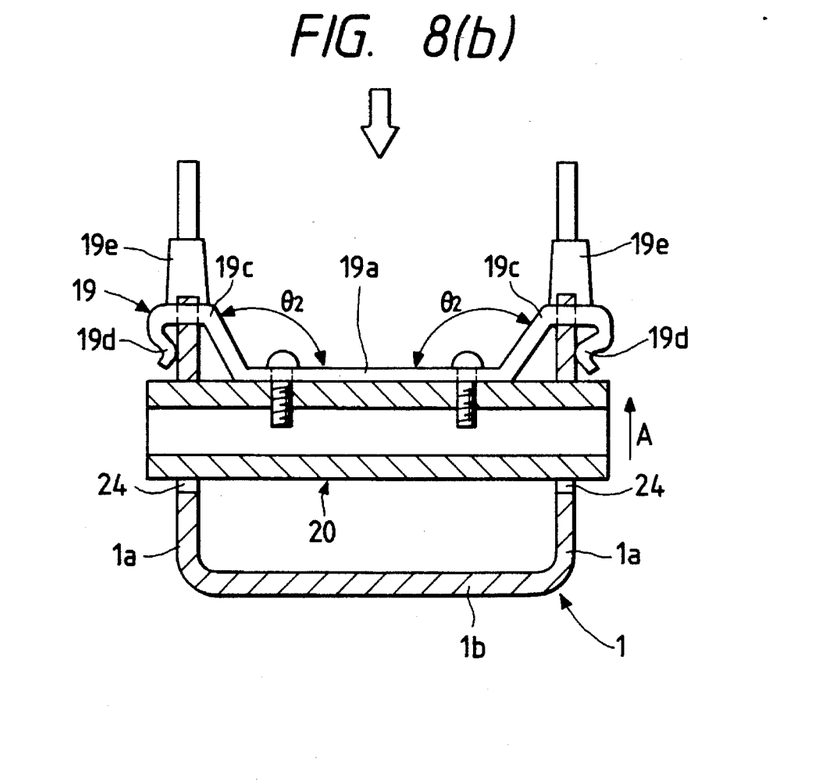

As shown in FIG. 7, the upper stay 19 is made up of a plate member such as a thin metal plate having a predetermined configuration which is formed by blanking. Both end portions of the mounting plate 19a are bent into hooking portions 19c which are engaged with the edges of the side boards 1a. The hooking portions 19c have mounting holes 19b, respectively, and the hooking portions 19c include: pushing pieces 19e which, when the upper stay 19 is secured to the base 1, push the upper edges of the side boards 1a; and pushing portions 19d which, in the same case, push the side boards 1a inwardly of the base. More specifically, the upper stay 19 is shaped as shown in the parts (a) and (b) of FIG. 8. That is, it is so shaped that the bend angle $\theta_1$ which each of the hooking portions 19c forms with the mounting plate 19a before the upper stay 19 is coupled to the base is larger than that $\theta_2$ after coupled to the base.

Figure 9:
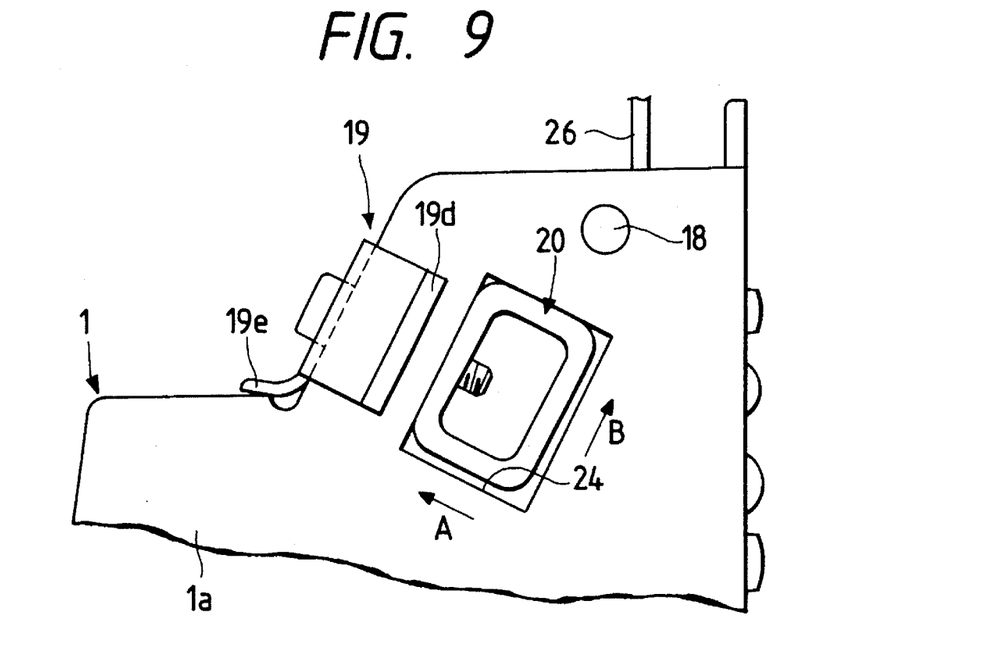
FIG. 9 is an enlarged side view showing the upper stay shown in FIG. 1 which is mounted on the base.

Hence, when, after the mounting plate 19a is secured to the upper plate 20 with screws both ends of which are inserted into through-holes 24 formed in the side boards 1a, the upper stay 19 is coupled to the side boards 1a, it is elastically deformed while the bend angle is being changed from $\theta_1$ to $\theta_2$, thus building up a restoring elastic force. This restoring elastic force urges the upper plate 20 in the direction of the arrow A in the part (b) of FIG. 8. At the same time, the aforementioned pushing pieces 19e push the upper edges of the side boards 1a, so that the upper plate 20 is urged substantially upwardly. Hence, as shown in FIG. 9 the upper plate 20 is urged with respect to the base 1 both in the direction of the arrow A and in the direction of the arrow B. As a result, the upper plate 20 is accurately positioned with its both end portions pushed against the upper corners of the through-holes 24 formed in the side boards 1a. In addition, the pushing portions 19d of the upper stay 19 push the side boards 1a inwardly of the base 1, as a result of which the upper plate 20 is secured to the base without play in the longitudinal direction.

As is apparent from the above description, the upper stay 19 has the elastically deformable portions adapted to urge the upper plate 20 in the above-described directions. Hence, the fixed position, and the angle of inclination of the upper plate 20 are positively determined with the aid of the through-holes 24; that is, the upper plate 20 thus mounted has no play. Accordingly, the embodiment is free from the problems that would result if the upper plate 20 is not settled because of dimensional errors between the upper stay 19 and the base 1, or it is impossible to completely secure the upper stay 19 to the upper plate 20 with the screws because the former 19 is not in close contact with the latter 20.

As was described above, the upper plate 20 is fixedly secured to the mounting plate 19a of the upper stay 19 after both end portions thereof are engaged with the through-holes 24 formed in the side boards 1a. Therefore, the upper plate 20 is so positioned that its slide contact surface 21 for guiding the clamp 6 to the webbing tightening position forms a predetermined angle with a lower plate 16 which is fixedly secured to the back board 1b of the base in such a manner that the distance between the slide contact surface 21 and the lower plate 16 is shorter as one moves upwardly.

The clamp 6 is so positioned that, with its acute end portion at the top, the planar portion 6d is in surface contact with the slide contact surface 20a of the upper plate 20. The clamping teeth 6c of the clamp 6 thus positioned are set in parallel with the surface of the webbing 26 at all times, and therefore the clamp 6 sliding on the slide contact surface 20a of the upper plate 20 is able to uniformly fasten the webbing 26. A return spring 15 is connected between an engaging portion 6b protruded from the rear end of the clamp 6 and the rear end face 20b of the upper plate 20, to urge the clamp 6 so that the latter 6 may not engage with the webbing 26.

A clamp lever 7 is provided below the clamp 6 to regulate the movement of the clamp 6 which is urged by the return spring 15. The clamp lever 7 together with an outer plate 8 form a lever member which is interlocking means for moving the clamp 6 in the webbing tightening direction in association with the emergency locking mechanism. The outer plate 8 is provided outside the side board 1a and engaged with the above-described tension plate 9.

The clamp lever 7 comprises: a pair of plate-shaped members 7a and 7b which have slots 7f and 7f, respectively, which are engaged with shafts 6a and 6a protruded from the side walls of the clamp 6; and a coupling part 7c which is connected between those plate-shaped members 7a and 7b and abutted against the rear end wall of the clamp 6. The plate-shaped members 7a and 7b are swingably supported on a lever pin 17, which is inserted into holes 7d formed in the plate-shaped members 7a and 7b, and through-holes 23 which are formed in the side boards 1a in such a manner that they are in alignment with the holes 7d, respectively. One end portion of the lever pin 17 is inserted into a hole 8b formed in the aforementioned outer plate 8, so that the latter 8 is swingably supported along the side board 1a. The outer plate 8 comprises: an inside shaft 8a which is extended inwardly through the elongated hole 22 of the side board 1a to engage with an engaging hole 7e formed in the plate-shaped member 7a; and an abutting part 8c which is engaged with an engaging part 9d of a second swinging end portion of the above-described tension plate 9.

The clamp lever 7, being prevented from turning downwardly with the inside shaft 8a locked to the elongated hole 22, regulates the movement of the clamp 6 against the elastic force of the return spring 15. That is, in the clamp 6, its shafts 6a are engaged with the slots 7f formed in the swinging end portions of the plate-shaped members 7a and 7b, and its rear end wall is supported by the coupling part 7c, and therefore its clamping teeth 6c are held in such a manner that they are not in engagement with the webbing 26. Hence, when the outer plate 8 is turned upwardly, the clamp lever 7 is turned upwardly through the inside shaft 8a of the outer plate 8. The clamp lever 7 thus turned pushes the shafts 6a of the clamp 6 against the elastic force of the return spring 15, as a result of which the clamp 6 is moved to engage with the webbing 26 while the planar portion 6d is being slidably moved on the slide contact surface 20 of the upper plate 20. In this operation, the aforementioned elongated hole 22 will not interfere with the inside shaft 8a of the outer plate 8.

The engaging part 9d of the second swinging portion of the tension plate 9 is pushed downwardly (in FIG. 2) by the outer plate 8 to which the elastic force of the return spring 15 is applied which is greater than that of the return spring 12; that is, the tension plate 9 is urged to turn in the direction of the arrow $X_2$ in FIG. 2. Hence, the pawl pin 10 is urged in the webbing winding direction on the side of one end 21a of the elongated hole 21 which is on the back board side.

Thus, the lever member comprising the clamp lever 7 and the outer plate 8, and the tension plate 9 form control means for moving the clamp 6 in the webbing holding direction to position the latter 6 at a first position where pulling the webbing is prevented, and a second position where pulling the webbing is permitted.

Figure 3:
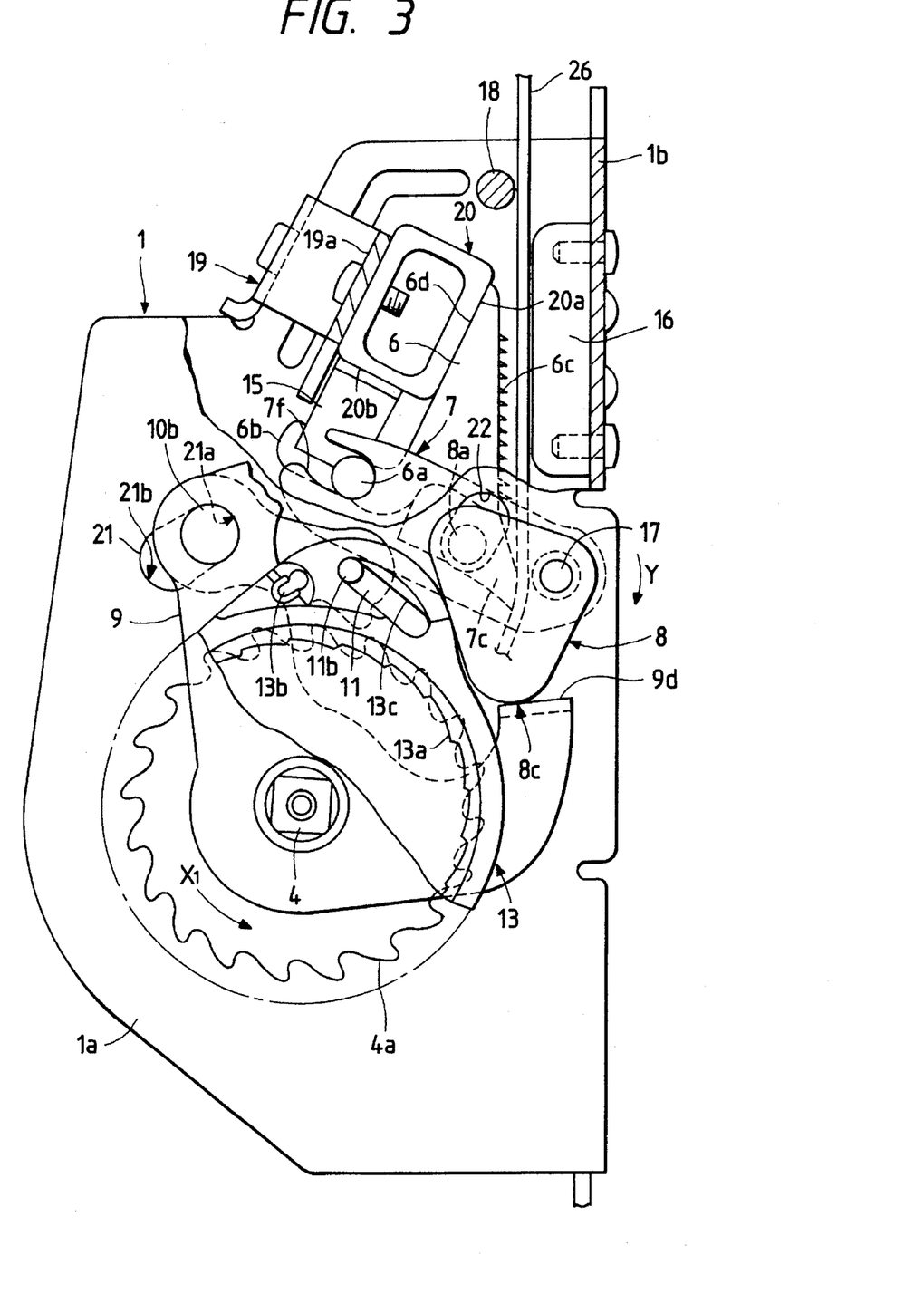
FIGS. 3 through 5 are side views, with parts cut away, for a description of the operation of a clamping mechanism in the clamp-operated retractor shown in FIG. 1.
Figure 6:
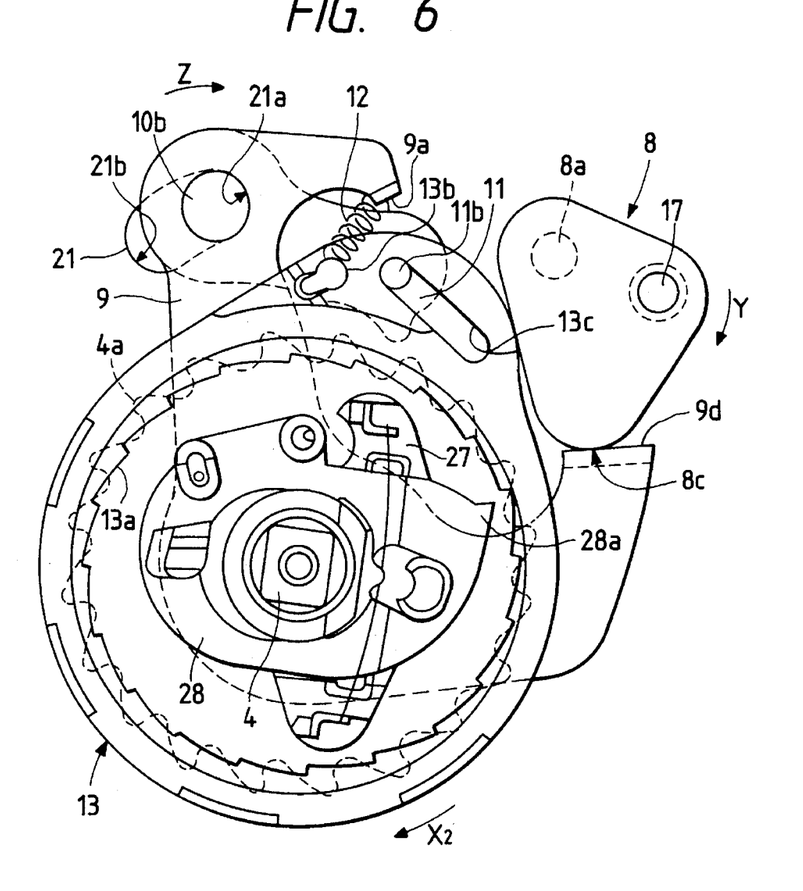
FIG. 6 is an enlarged diagram showing essential components of an emergency locking mechanism in the clamp-operated retractor shown in FIG. 1.

The clamp-operated retractor thus constructed operates as follows:

When the vehicle is in normal state, as shown in FIG. 3 the inside shaft 8a of the outer plate 8, which is engaged with the engaging hole 7e of the clamp lever 7, is positioned on the bottom of the elongated hole 22 by the elastic force of the return spring 15, and the clamp 6 is urged by the elastic force of the return spring 15 so as not to engage with the webbing 26. As shown in FIG. 6, the latch cup 13 is urged in the direction of the arrow $X_2$ by the return spring 12 connected between the spring hanger 13b of the latch cup 13 and the spring hanger 9a of the tension plate 9, while the pawl 11 whose pawl guide protrusion 11b is engaged with the pawl guide hole 13c is urged so as not to engage with the latch plate 4a. Thus, the webbing 26 can be freely pulled out. The webbing is kept not in contact with the clamp teeth 6c with the aid of the aforementioned coupling part 7c and a webbing guide pin 18 which are inserted into through-holes 25 formed in the upper portion of the side boards 1a.

Figure 4:
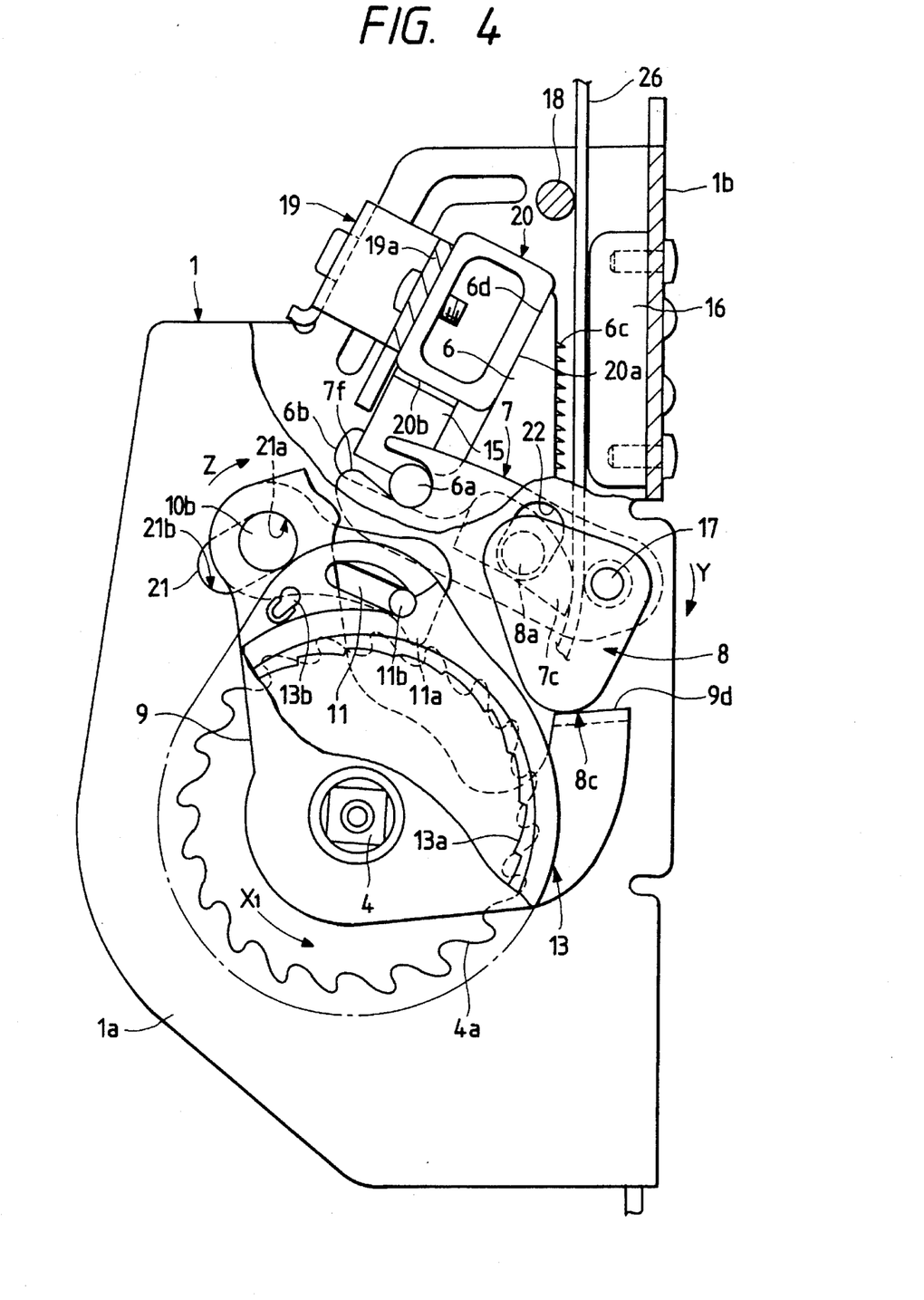

In an emergency such as collision, tension is applied to the webbing 26. That is, when a torque greater than the predetermined value is applied to the winding shaft 4 in the webbing pull-out direction (i.e., in the direction of the arrow $X_1$), an inertial force is applied to the inertial member (not shown), so that the rotation of the winding shaft 4 in the webbing pull-out direction is delayed. As a result, the locking means operates; that is, the engaging portion 28a of a locking member 28 is engaged with the internal teeth 13a of the latch cup 13, and therefore the torque of a flange 27 is transmitted to the latch cup 13. Thus, as shown in FIG. 4, the latch cup 13 is turned in the direction of the arrow $X_1$ against the elastic force of the return spring 12. And the pawl guide hole 13c engaged with the pawl guide protrusion 11b turns the pawl 11 in the direction of the arrow Z with the aid of the pawl guide protrusion 11b, so that the engaging part 11a of the pawl 11 is engaged with the latch plate 4a.

Figure 5:
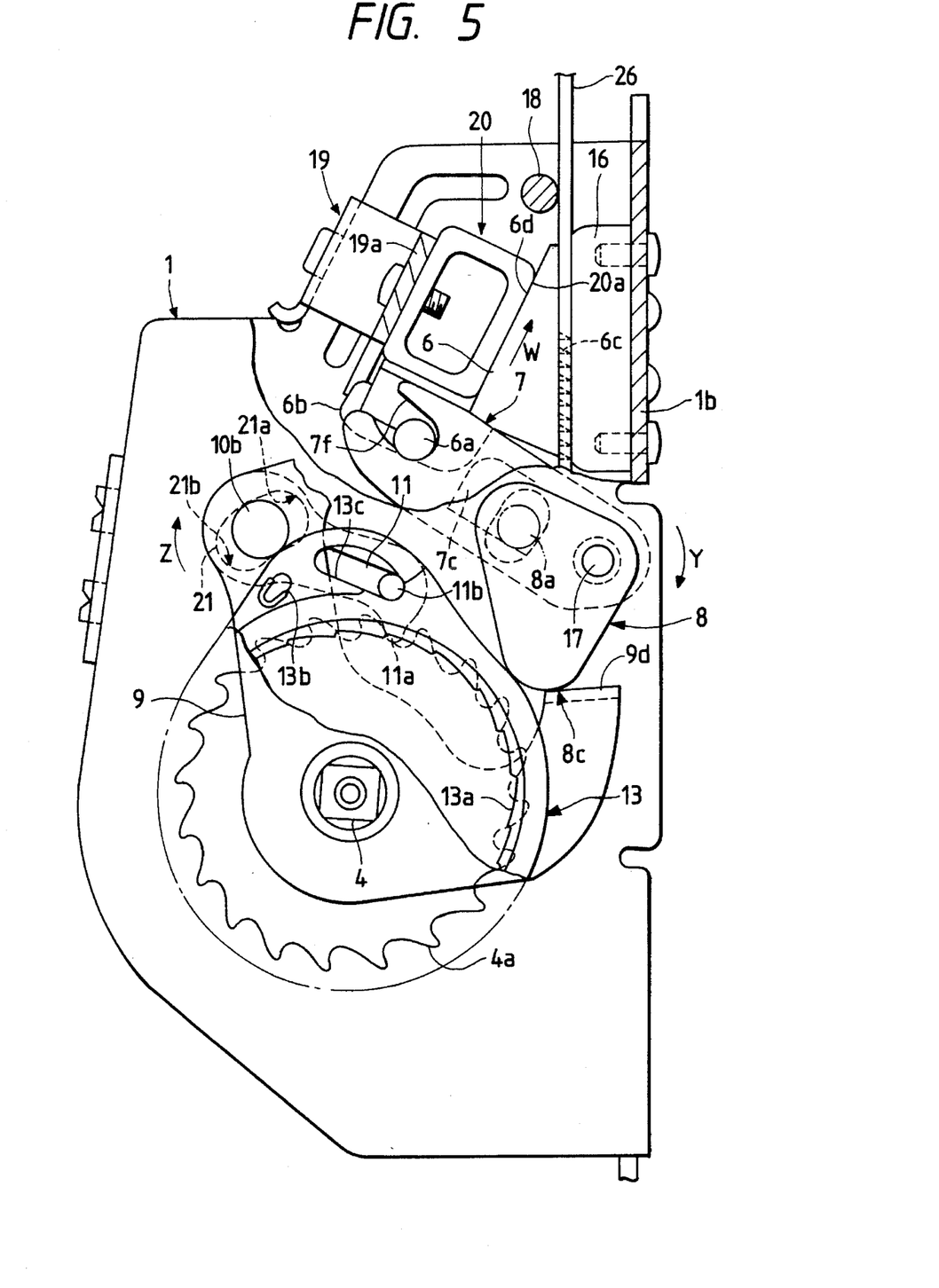

When, with the engaging part 11a of the pawl 11 engaged with the latch plate 4a, the winding shaft 4 is further turned in the direction of the arrow $X_1$, as shown in FIG. 5 the pawl pin 10 supporting the pawl 11 is shifted from the one end 21a of the elongated hole 21 (on the back board side) to the other end 21b (on the front side) against the elastic force of the return spring 15 acting through the tension plate 9, so that the latter 9 is swung in the direction of the arrow $X_1$. As a result, the engaging part 9d of the tension plate 9 turns the outer plate 8 in the direction of the arrow Y through the abutting part 8c of the outer plate, and therefore the clamp lever 7 is turned in the direction of the arrow Y with the aid of the inside shaft 8a engaged with the elongated hole 22.

As a result, the clamp 6, being engaged with the slots 7f formed in the swinging end portions of the clamp lever 7, is immediately moved upwardly along the slide contact surface 20a of the upper plate 20. The slide contact surface 20a is so inclined with respect to the lower plate 16 that the distance between the slide contact surface 20 and the lower plate 16 is shorter upwardly, as was described before. Hence, the wedge-shaped clamp 6 moved upwardly against the elastic force of the return spring 15 moves in the webbing holding direction (i.e., in the direction of the arrow W), so that the webbing 26 is positively held between the slide contact surface 20a and the lower plate 16 in such a manner that it is nipped between them. That is, the webbing 26, being positively held between the clamp 6 and the lower plate 16, is prevented from being pulled out.

The movement of the pawl pin 10 supporting the pawl 11 is stopped when the pawl pin 10 abuts against the end 21b, on the front side, of the elongated hole 21, so that the winding shaft 4 is prevented from being turned in the direction of the arrow $X_1$. The timing that the pawl pin 10 abuts against the end 21b of the elongated hole 21 is so determined that it occurs immediately after the clamping teeth 6c have completely bit into the webbing 26. The operating timing of the clamp 6 and the pawl 11 can be freely changed by changing the configuration of the abutting part 8c of the outer plate 8 and that of the elongated hole 21 of the side board 1a.

In the case, too, when in an emergency the vehicle speed is changed more than a predetermined value, the above-described vehicle body acceleration sensing means 30 activates the locking means, and the clamping mechanism and the emergency locking means operate in the above-described manner.

When the tension applied to the webbing 26 is eliminated, the force of causing the clamp 6 to hold the webbing is eliminated. As a result, the clamp 6 is urged by the elastic force of the return spring 15 so that it is disengaged from the webbing 26. Thus, the clamping mechanism is released. At the same time, the tension plate 9 is turned in the direction of the arrow X, thus being released. That is, the clamp 6 and the tension plate 9 are returned to their original positions. When the webbing is further wound, the pawl 11 is turned in the direction opposite to the direction of the arrow Z, so that its engaging part 11a is disengaged from the latch plate 4a. When the webbing is further wound, the engaging portion 28a of the locking member 28 is disengaged from the internal teeth 12a of the latch cup 13, so that the latter 13 is turned in the direction of the arrow $X_2$ by the elastic force of the return spring 12 to the original position, whereby the webbing can be freely pulled out.

When, in the retractor having a clamping mechanism thus organized, the locking means of the emergency locking mechanism is activated to turn the latch cup 13 in the webbing pull-out direction, the pawl 11 is engaged with the latch plate 4a, so that the tension plate 9 is turned in the webbing pull-out direction by the torque of the winding shaft 4, and the lever member made up of the clamp lever 7 and the outer plate 8 is turned by the tension plate 9 to move the clamp 6 in the webbing holding direction. Thus, the webbing 26 can be positively prevented from being pulled out. For the clamp-operated retractor, unlike the transfer member in the conventional clamping mechanism, it is unnecessary to provide, in addition to the pawl 11, a locking member engaging with the latch plate 4a mounted on the winding shaft 4, which reduces the number of components of the clamp-operated retractor as much, and contributes to simplification of the construction and to reduction of the manufacturing cost.

In a second embodiment of this invention, an engaging protrusion is formed on the clamp 6 in such a manner that it is inserted into the elongated hole formed in the side board 1a, and a cam surface which is engaged with the engaging protrusion is formed on the tension plate 9 so that, in association with the swing of the tension plate 9, the clamp 6 is moved to the first position where pulling the webbing 26 is prevented and to the second position where pulling the webbing is permitted; that is, a cam mechanism is formed as interlocking means between the tension plate 9 and the clamp 6.

In the second embodiment, the number of components of the transfer means can be further reduced which is required to transfer the rotation of the latch cup 13 to the clamp 6 to cause the latter 6 to clamp the webbing, and accordingly the energy loss due to the play thereof can be decreased. Therefore, the webbing 26 can be quickly prevented from being pulled out; that is, the clamp 6 is able to clamp the webbing immediately when the inertia sensing means detects the collision.

The clamp lever, the outer plate, and the tension plate, which provide the interlocking means which forms the control means in the clamp-operated retractor of the invention, are not limited those which have been described above. That is, it goes without saying that they may be changed and modified in various manners without departing from the invention.

Figure 10:
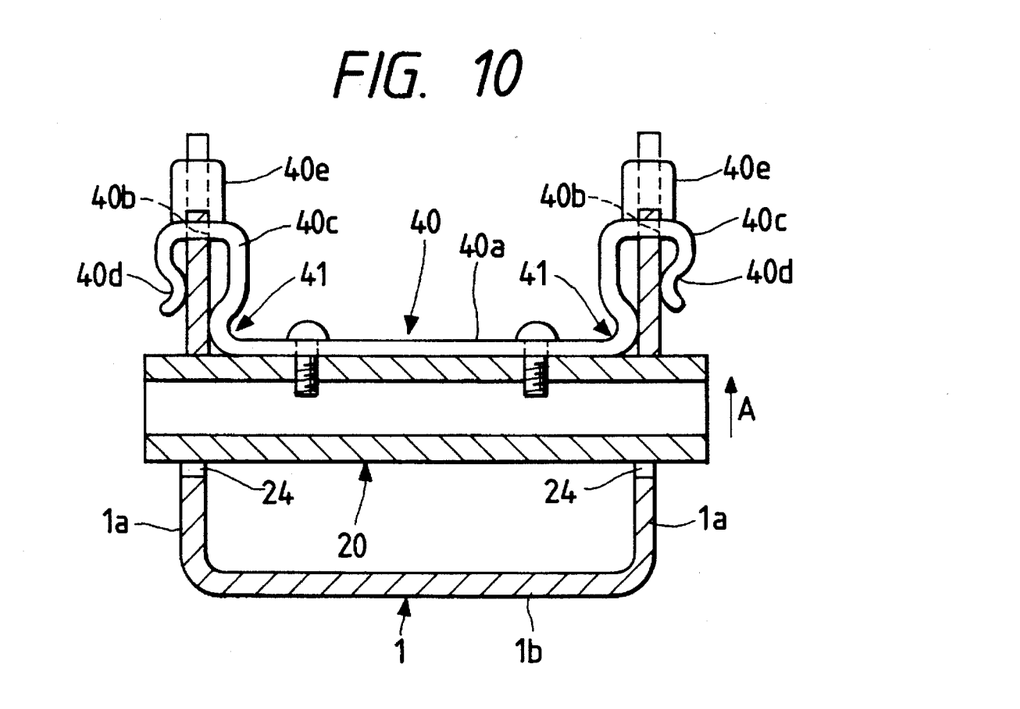
FIG. 10 is a fragmentary sectional view showing an upper stay mounted on the base in another embodiment of the invention.

FIG. 10 is a fragmentary sectional view of an upper stay 40 mounted in a third embodiment of the invention. The upper stay 40 includes a mounting plate 40a, both end portions of which are bent into hooking portions 40c which are engaged with the edges of the side boards 1a. The hooking portions 40c have mounting holes 40b, respectively, and the hooking portions 40c include: pushing pieces 40e which, when the upper stay 40 is secured to the base 1, push the upper edges of the side boards 1a; and pushing portions 40d which, in the same case, push the side boards 1a inwardly of the base. The coupling portions between the mounting plate 40a and the hooking portions 40c are formed into elastically bendable portions 41. The mounting plate 40a is parallelly movable towards the back board 1b so that the upper plate 20 secured to the base with both ends engaged with the through-holes 24 is urged in the direction of the arrow A.

That is, the upper stay 40 urges the upper plate 20 in the direction of the arrow A in FIG. 10 with the aid of the elastic restoring force of the elastic bent portions 41, and the pushing pieces 40e push the upper edges of the side boards 1b. Hence, the upper plate 20 is positioned accurately with its both end portions pushed against the upper corners of the through-holes 24.

Figure 11:
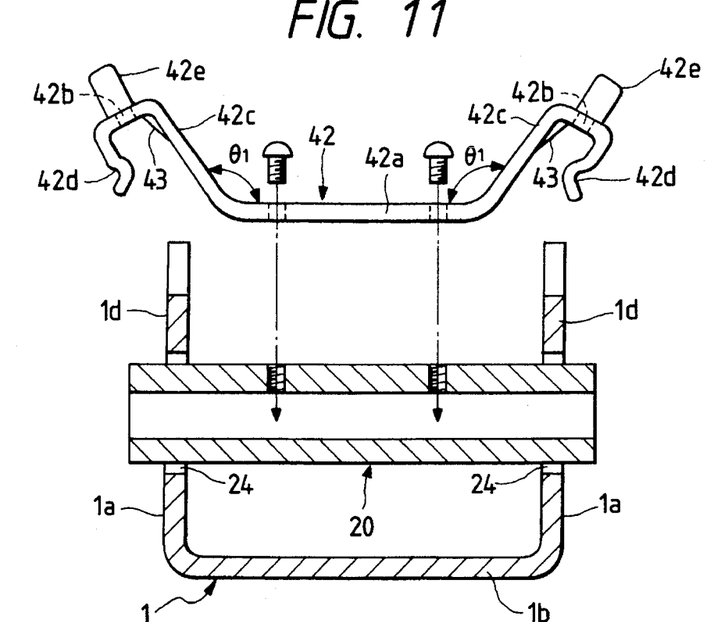
FIG. 11 is a fragmentary sectional view showing an upper stay to be mounted on the base in another embodiment of the invention.

FIG. 11 shows an upper stay 42 in a fourth embodiment. The upper stay 42 includes a mounting plate 42a, both end portions of which are bent into hooking portions 42c which are engaged with the edges of the side boards 1a. The hooking portions 42c have mounting holes 42b, respectively, and include: pushing pieces 42e at the ends which, when the upper stay 42 is secured to the base 1, push the upper edges of the side boards 1a; and pushing portions 42d which, in the same case, push the side boards 1a inwardly of the base. Furthermore, a bead 43 is formed on the inner surface of each of the hooking portions 42c to allow the inner surface wall of the latter which confronts with the inner surface of the respective side board 1a and the inner surface around the through-hole 42b to smoothly merge with each other.

In securing the upper stay 42 to the side boards 1a, the protrusions 1d of the side boards 1b slidably contact the inner surfaces of the hooking portions 42c, so that the latter 42c are elastically deformed inwardly. In this operation, the protrusions 1d are smoothly engaged with the mounting holes 42b being guided by the beads 43, which improves the assembling efficiency of the clamp-operated retractor.

Figure 12:
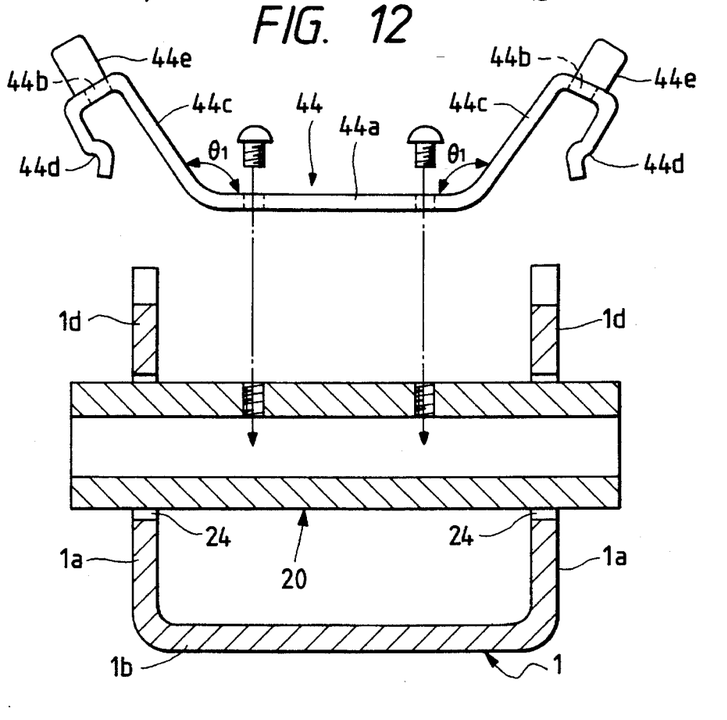
FIG. 12 is a fragmentary sectional view showing an upper stay to be mounted on the base in another embodiment of the invention.

FIG. 12 shows an upper stay 44 in a fifth embodiment. The upper stay 44 includes a mounting plate 44a, both end portions of which are bent into hooking portions 44c which are engaged with the edges of the side boards 1a. The hooking portions 44c have mounting holes 44b, respectively, and include: pushing pieces 44e at the ends which, when the upper stay 44 is secured to the base 1, push the upper edges of the side boards 1a; and pushing portions 44d which, in the same case, push the side boards 1a inwardly of the base. More specifically, each of the hooking portions 44c is bent at a position where its inner surface which confronts with the inner surface of the respective side board 1a is substantially flush with the inner surface around the mounting hole 44b.

In securing the upper stay 44 to the side boards 1a, the protrusions 1d of the side boards 1b slidably contact the inner surfaces of the hooking portions 44c, so that the latter 44c are elastically deformed inwardly. In this operation, the protrusions 1d are smoothly engaged with the mounting holes 44b. This means that the retractor of the invention can be assembled with high efficiency.

In the above-described embodiments, the wedge-shaped clamping member, namely, the clamp 6 is moved along the upper plate 20, to clamp the webbing 26 on the upper plate 16. This arrangement may be modified as follows: A clamping member is employed which comprises a clamp holder which is swingably supported, and a clamp is held on the clamp holder at the swinging end. In this modification, the swinging end portion of a lever member having an abutting part which is abutted against the engaging part formed in the second swinging end portion of the tension plate is engaged with the clamp holder, so that the clamp holder is swung in the webbing holding direction by the rotation of the tension plate. Alternatively, an engaging protrusion adapted to engage with a cam surface formed in the second swinging end portion of the tension plate is extended from the clamp holder, so that the clamp holder is directly swung in the webbing holding direction by the rotation of the tension plate.

In the embodiments, the emergency locking mechanism is designed as described above; however, the invention is not limited thereto or thereby. That is, the technical concept of the invention is applicable to a clamp-operated retractor having an emergency locking mechanism comprising inertia sensing means and locking means which are different from those which have been described.

As was described above, in the retractor having a clamping mechanism, the control means for moving the clamp member in the webbing holding direction to position the clamp member at the first position where pulling the webbing is prevented and at the second position where pulling the webbing is permitted, comprises: the tension plate which is so arranged to be rotatable around the same axis as that of the ratchet wheel, and urges the latch member in the webbing winding direction and rotatably supports the pawl member; and the interlocking means which is driven in association with the rotation of the tension plate, to move the clamp member to the first or second position. Hence, for the clamp-operated retractor, unlike the transfer member in the conventional clamping mechanism, it is unnecessary to have, in addition to the pawl member, a locking member engaging with the ratchet wheel mounted on the winding shaft. This means that the number of components can be reduced as much, and the resultant clamp-operated retractor is accordingly simplified in construction and reduced in manufacturing cost.

In the case where the cam mechanism comprising the cam surface provided between the tension plate and the clamp o member, and the engaging protrusion is employed as the interlocking means, the number of components of the transfer means can be further reduced which is required to transfer the rotation of the latch member to the clamp member to cause the latter to clamp the webbing, and accordingly the energy loss due to the play of the transfer means can be decreased. In this case, the webbing is quickly stopped from being pulled out; that is, the clamp member is able to clamp the webbing immediately when the inertia sensing means detects the collision.

That is, the retractor including the emergency locking mechanism adapted to lock the rotation of the winding shaft in the webbing pull-out direction in an emergency such as collision, in which the webbing clamping mechanism able to quickly stop the webbing from being pulled out is simple in structure, can be provided at low manufacturing cost according to the invention.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. A retractor with a clamping mechanism for directly clamping a webbing to prevent said webbing from being pulled out, which comprises:

a base including a back board, a first side board with a through-hole and a second side board with an elongated hole;

a pawl pin inserted through the first and second side boards, and including a first end supported in the through-hole and a second end swingably passing through the elongated hole;

a winding shaft rotatably supported on the first and second side boards of said base for winding said webbing;

a ratchet wheel mounted on said winding shaft;

a pawl member supported rotatably to the second end of the pawl pin, the pawl member engaging with said ratchet wheel to lock the rotation of said winding shaft in a webbing pull-out direction;

a movable clamp member;

a lower plate secured to said base, said lower plate cooperating with said clamp member clamp said webbing; and control means for moving said clamp member to a first position where the pulling of said webbing is prevented and a second position where the pulling of said webbing is permitted, said control means comprising:

a tension plate which is so arranged as to be rotatable around the same axis as that of said ratchet wheel, and has a swinging end portion and a fitting hole for fitting the second end of the pawl pin; and a lever engaging with the swinging end portion for moving said clamp member from said second position to said first position in association with the rotation of said tension plate in the webbing pull-out direction.

2. A retractor as claimed in claim 1, further comprising:

a return spring for urging said clamp member so as not to engage said clamp member with said webbing, wherein the lever comprises:

an outer plate supported rotatably to the base and engaged with the swinging end portion of said tension plate; and a clamp lever for moving the clamp member from the second position to the first position in accordance with the rotation of the outer plate.

3. A retractor as claimed in claim 2, in which said clamp lever comprises:

a pair of plate-shaped members each having a slot; and a coupling member connected between said pair of plate-shaped members, said clamp lever being swingably supported on a lever pin which is secured to said base.

4. A retractor as claimed in claim 3, in which said clamp member has shafts which are engaged with said slots formed in swinging end portions of said plate-shaped members, and rear end portion is supported by said coupling member of said clamp lever.

5. A retractor as claimed in claim 3, in which said outer plate has a through-hole into which said lever pin is inserted so as to swingably support said outer plate.

6. A retractor as claimed in claim 4, in which said outer plate comprises:

an inside shaft which is engaged with an engaging hole formed in said plate-shaped member of said clamp lever; and an abutting part which engages with an engaging part formed in said swinging end portion of said tension plate.

7. A retractor as claimed in claim 1, in which the fitting hole of said tension plate supports the second end of the pawl pin through said pawl member interposed between the tension plate and the second side board.

8. A retractor as recited in claim 1, further comprising an emergency locking mechanism for locking the rotation of the winding shaft in the webbing pull-out direction in an emergency, wherein the emergency locking mechanism comprises:

a latch member rotating together with said winding shaft in the webbing pull-out direction to cause said pawl member to engage with said ratchet wheel thereby to lock the rotation of said winding shaft in the webbing pull-out direction;

an inertial member rotating in association with said winding shaft; and locking means for coupling said latch member to said winding shaft when said inertial member delays in rotation with respect to said winding shaft.

9. A clamp-operated retractor as claimed in claim 8, in which said tension plate is adapted to urge said latch member in a webbing winding direction, and rotatably supports said pawl member.

10. A retractor with a clamping mechanism for directly clamping a webbing to prevent the webbing from being pulled out, said retractor comprises:

a base;

a winding shaft rotatably supported on the base for winding the webbing;

a ratchet wheel mounted on the winding shaft;

a movable clamp member;

a lower plate secured to the base for clamping the webbing between the clamp member and the lower plate;

an upper plate for guiding said clamp member in a webbing clamping direction;

an upper stay for holding said upper plate, the upper stay including a mounting plate for mounting said upper plate and elastically deformable portions for urging said upper plate; and control means for moving said clamp member in the webbing clamping direction to a first position where the pulling of said webbing is prevented and a second position where the pulling of said webbing is permitted.

11. A retractor as claimed in claim 10, in which each of said elastically deformable portions of said upper stay comprises:

a pair of hooking portions which are formed by bending both end portions of said mounting plate so as to be engaged with said base; and pushing portions for pushing said base to urge said upper plate.

12. A retractor as claimed in claim 10, in which each of said elastically deformable portions of said upper stay includes:

a hooking portion hooked to said base;

an elastically bendable portion formed between said mounting plate and the hooking portion; and pushing portions for pushing said base to urge said upper plate.

13. A retractor as claimed in claim 10, in which said control means comprises:

a tension plate which is so arranged as to be rotatable around the same axis as that of said ratchet wheel; and interlocking means for moving said clamp member between said first position and said second position in association with the rotation of said tension plate.

* * * * *